(12) United States Patent
Mester

(10) Patent No.: US 9,249,907 B2
(45) Date of Patent: Feb. 2, 2016

(54) FITTING FOR CONNECTING A PIPE

(75) Inventor: Reiner Mester, Lennestadt (DE)

(73) Assignee: VIEGA GMBH & CO. KG, Attendorn (DE)

( * ) Notice: Subject to any disclaimer, the term of this patent is extended or adjusted under 35 U.S.C. 154(b) by 656 days.

(21) Appl. No.: 12/726,915

(22) Filed: Mar. 18, 2010

(65) Prior Publication Data

US 2010/0244436 A1 Sep. 30, 2010

(30) Foreign Application Priority Data

Mar. 31, 2009 (DE) .......................... 10 2009 015 186

(51) Int. Cl.
*F16L 13/00* (2006.01)
*F16L 13/14* (2006.01)

(52) U.S. Cl.
CPC .......... *F16L 13/142* (2013.01); *F16L 2013/145* (2013.01)

(58) Field of Classification Search
CPC ........................... F16L 13/142; F16L 2013/145
USPC ........................ 285/39, 382, 382.1, 382.2, 349
See application file for complete search history.

(56) References Cited

U.S. PATENT DOCUMENTS

| | | | | |
|---|---|---|---|---|
| 166,735 | A * | 8/1875 | Walworth | 285/382.2 |
| 2,367,206 | A * | 1/1945 | Davis | 29/421.2 |
| 3,149,861 | A * | 9/1964 | Larsson | 285/349 |
| 3,477,750 | A * | 11/1969 | Powell | 285/363 |
| 3,579,794 | A * | 5/1971 | Powell | 29/237 |
| 4,328,982 | A * | 5/1982 | Christianson | 285/351 |
| 5,484,174 | A * | 1/1996 | Gotoh et al. | 285/382.2 |
| 6,581,983 | B1 * | 6/2003 | Viegener | 285/382 |
| 6,769,722 | B1 * | 8/2004 | Krauleidis | 285/382 |

FOREIGN PATENT DOCUMENTS

| | | |
|---|---|---|
| CA | 2314144 A1 | 4/2000 |
| DE | 1187870 | 2/1965 |
| DE | 2233102 | 1/1974 |
| DE | 10013568 C1 | 6/2001 |

(Continued)

OTHER PUBLICATIONS

Tuffe (English Translation of the Description portion of EP 1533555), [online], May 25, 2005, [Date Retrieved: May 22, 2015], Retrieved from the Internet:<URL:http://worldwide.espacenet.com/publicationDetails/biblio?DB=EPODOC&II=0&ND=3&adjacent=true&locale=en_EP&FT=D&date=20050525&CC=EP&NR=1533555A1&KC=A1>.*

*Primary Examiner* — James Hewitt
*Assistant Examiner* — James Linford
(74) *Attorney, Agent, or Firm* — Rankin, Hill & Clark LLP

(57) ABSTRACT

A fitting (1) for connecting a pipe which includes a hollow body (2) made in one piece, which extends in a pipe insertion direction (X) about a longitudinal axis (L). The hollow body (2) includes at least one pressing section (3), which can be plastically deformed in a radial direction (Y) using a press tool (4), which can be attached prior to pressing and which can be detached after pressing. The pressing section (3) includes a circumferential bead (5), which projects outwardly in a radial direction, and which, on the inside, forms a groove (5a) for accommodating a sealing ring. The pressing section (3) further includes at least two cutting blades (6, 7), one arranged upstream of the bead (5) and one arranged downstream from the bead (5), relative to the pipe insertion direction (X). A sufficiently tight sealing is thus ensured, even when using a lead and nickel-free alloy.

9 Claims, 3 Drawing Sheets

(56) References Cited

FOREIGN PATENT DOCUMENTS

Figure 1A:
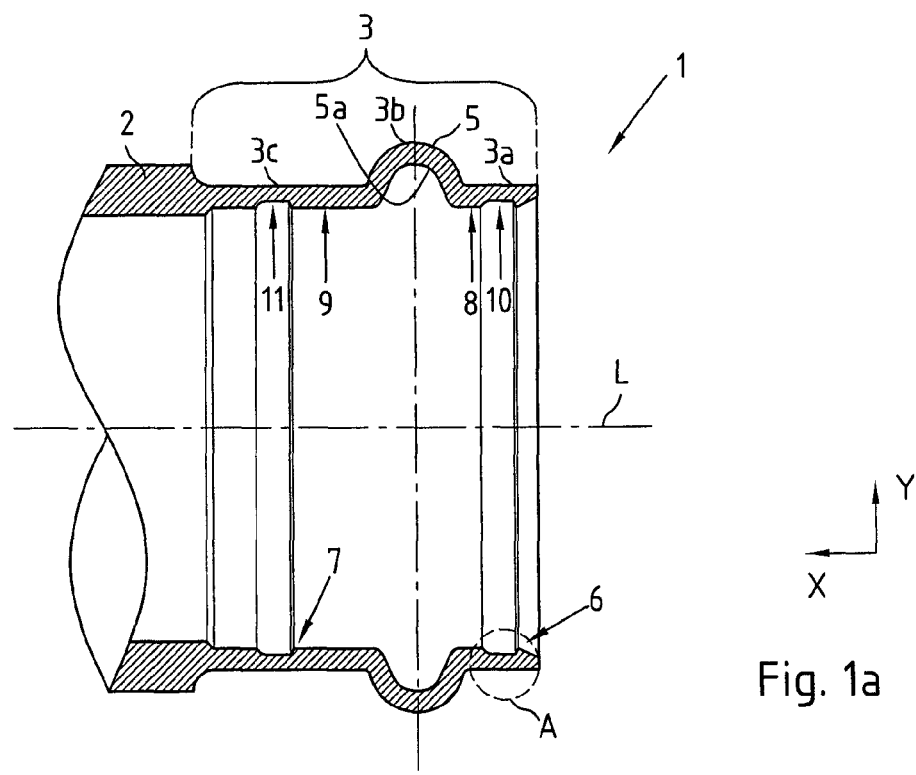

| | | | |
|---|---|---|---|
| DE | 101 44 100 C1 | 2/2003 | |
| DE | 10207201 A1 | 9/2003 | |
| EP | 343395 A2 * | 11/1989 | ............. F16L 13/14 |
| EP | 0797037 A2 | 9/1997 | |
| EP | 1045041 A1 | 10/2000 | |
| EP | 1533555 A1 * | 5/2005 | |
| WO | 91/14894 | 10/1991 | |
| WO | 2008/007396 A1 | 1/2008 | |
| WO | 2008/103315 A2 | 8/2008 | |

* cited by examiner

FITTING FOR CONNECTING A PIPE

The invention relates to a fitting for connecting a pipe, in particular for the installation field, as well as to a corresponding pressing system comprising such a fitting and comprising a press tool which can be attached prior to the pressing and which can be detached after the pressing.

In terms of the invention, a fitting is a hollow body through which a medium, for example a gas or a liquid, can flow and which is substantially cylinder-shaped, at least in sections, and which can be connected to a pipe end of a piping system. The fitting can also comprise a plurality of, for example two, hollow bodies, which are connected to one another and which are substantially cylinder-shaped and the longitudinal axes of which can also extend at an angle to one another, so as to thus form an angled pipe connecting piece (elbow pipe), for example. To simplify matters, only one hollow body and the particular embodiment thereof will be mentioned in the following, even though a fitting in terms of the invention can also comprise a plurality of hollow bodies, all of which are in particular also embodied in the same manner.

To simplify the connection of a pipe as much as possible, the press fitting technology is used to an increasing extent. For this purpose, the hollow body, which serves to connect the pipe, comprises at least one pressing section, which is plastically deformed by means of a press tool after the insertion of the pipe end into the hollow body in such a manner that the fitting forms a press fit with the pipe in the area of the pressing section.

In this regard it should be emphasized that the press tool is a separate device, which is independent of the press connection and which is attached in the area of the pressing section prior to the pressing—in that two press jaws, for example, comprise the pressing section in radial direction—and which is completely removed again after the pressing, so that the press connection only comprises the fitting and the pipe end, but not the press tool anymore. A fitting for this type of press technology, also called press connection, must thus consist of a material which deforms by means of cold forming during the pressing in such a manner that a sufficiently firm and tight connection is ensured also after detaching the press tool. As will be defined in more detail below, mechanical characteristics, such as yield point, tensile strength, elongation at break and modulus of elasticity are notably important in the case of this type of connection. The mechanical characteristics must be chosen in such a manner that the reset characteristics are as small as possible and that the pull out strength or the compression strength, respectively, is as high as possible. Examples for a fitting or press connection, respectively, in the case of which the press tool is removed again after the pressing, can be found in DE 100 13 568 C1, in WO 2008/103315 A2, in WO 91/14894 A1, in DE 1 187 870 A, in EP 0 797 037 A2 and in DE 2 233 102 A. DE 102 07 201 A1, however, shows a completely different type of connection, in the case of which a pressing section is deformed in radial direction as well, but not by a detachable press tool, but instead by a pressing sleeve in threaded connection with the pressing section which must remain connected to the remaining fitting so as to ensure a firm and tight connection. As compared to the fitting and the connection type, on which the present invention is based, the mechanical characteristics of the material play only a minor role in the case of the last-mentioned state of the art, wherein in particular the reset characteristics are not important, due to the fact that the pressing sleeve permanently presses the pressing section to the pipe end in any case.

In the case of the state of the art, on which the invention is based, so-called leaded red brass has often been used in the past as material for the fitting, that is, an alloy on a copper base comprising portions of silicon, zinc as well as lead and tin. To increase the stability, it is also known to produce the fitting from a CuSiZn alloy, which is similar to red brass and which is free from lead and nickel. However, not using lead and nickel in the alloy leads to considerably different mechanical characteristics as compared to common leaded red brass alloys. Differences exist in particular in the case of the mechanical characteristics, such as yield point, tensile strength, elongation at break and modulus of elasticity, which are relevant for the present fitting or press connection, respectively. The increased stability is associated with increased forming forces and thus increased press tool pressures. The fitting or press connection, respectively, also has larger reset characteristics as compared to the common red brass, that is, the pressing section moves further back in radial direction in the direction of the initial position than in the case of a common leaded red brass alloy after the press tool is detached. The reached pressing degrees are greater, the pull out strength or compression strength, respectively, is thus lower and the settling properties (slip) are greater. A reduction of the wall thickness is necessary to compensate for the greater press capacities. Due to the reduced wall thickness, the fitting or press connection, respectively, in turn looses resistance to internal pressure once more and the slip properties become even greater. In the field of application of standard IAPMO PS 117 (IAPMO, International Association of Plumbing and Mechanical Officials), which pertains to piping systems consisting of copper and copper alloys which can be pressed, the slip distance, however, is limited and standard press connections consisting of the mentioned red brass-like alloy (comprising a smooth inner surface) cannot adhere thereto.

To improve the settling properties and to in particular reduce the slip distance, it is known from the afore-mentioned documents for a fitting consisting of a common alloy, but not of the new lead and nickel-fee red brass alloy, to provide loose cutting rings or integrally molded cutting blades or serrations inside the pressing section, which notch or cut, respectively, (cutting rings or cutting blades, respectively) into the surface of the inserted pipe end in response to the pressing or which indent the surface of the pipe end in radial direction (serrations). In so doing, an axial fixing of the pipe is attained after pressing in the case of a fitting of a common alloy. This type of axial fixing, however, has proven to not be sufficient in the case of said lead and nickel-free red brass alloy. In particular high pressures in the piping system can cause the connection between fitting and pipe end to loosen, which can lead to undesired leaks in the connecting area.

It is thus the object of the present invention to provide a fitting and a corresponding pressing system which ensure a sufficiently tight seal even when using said lead and nickel-free red brass alloy.

The afore-derived and specified object is solved according to a first teaching of the present invention by means of a fitting for connecting a pipe, in particular for the installation field, wherein the fitting comprises a hollow body which extends in a pipe insertion direction about a longitudinal axis, wherein the hollow body comprises at least one pressing section, which can be plastically deformed in radial direction by means of a press tool, which can be attached prior to the pressing and which can be detached after the pressing, wherein the pressing section comprises a circumferential bead, which projects outwardly in radial direction and which, on the inside, forms a groove for accommodating a sealing ring, wherein the pressing section further comprises at least two cutting blades, which are fixedly connected to the hollow body on the inside and each of which comprises a cutting edge, which is formed by a first blade surface and a second blade surface, wherein one cutting blade is arranged upstream of the bead relative to the pipe insertion direction and wherein a further cutting blade is arranged downstream from the bead relative to the pipe insertion direction.

In particular in response to the use of a lead and nickel-free CuSiZn alloy, this fitting or press connection, respectively, has the following advantages: On the one hand, an optimal tightness is attained in that provision is made in the pressing section for a circumferential bead comprising a sealing ring, which can be inserted on the inside and which can also compensate for the larger reset characteristic as compared to common red brass alloys. In response to the pressing, the at least two cutting blades further dig themselves into the pipe surface, thus attaining an axial fixing of the pipe relative to the fitting. Due to the fact that the two cutting blades are arranged on either side of the bead, they are automatically spaced apart from one another to the extent that both cutting blades can optimally engage with the pipe surface, without the deformation of the pipe surface caused by the one cutting blade to be able to impact the effect (the notching or cutting, respectively) of the other cutting blade to a noteworthy extent. The axial securing and with it the tightness are thus increased even further. This arrangement of the two cutting blades to the right and to the left of the bead also has the advantage that the pipe end is anchored evenly to the fitting on both sides of the sealing ring extending in the bead by means of the notching or cutting, respectively, of the cutting blades into the pipe surface, which, in turn, also even further increases the sealing effect.

To optimally ensure an axial fixing even in response to a high internal pressure of the pipe, provision is made according to an embodiment of the fitting according to the invention for the angle between both blade surfaces of at least one of the cutting blades in the non-pressed state to be at least 90°, in particular at least 95°, preferably at least 100°. An angle of this size leads to an increased stability of the cutting blades, so that they cannot easily deform in response to the pressing, but optimally notch or cut, respectively, into the pipe surface and anchor therein.

As an alternative or in addition, provision can also be made for the angle between one of the blade surfaces, preferably the blade surface pointing in the pipe insertion direction of at least one of the cutting blades and the longitudinal axis in the non-pressed state to be more than 45°, in particular more than 60°, preferably more than 75°. Such an angle ensures that, in the event of a high axial stress, the respective cutting blade cannot easily move out of the depression, which was created by the cutting blade in the pipe surface in response to the pressing.

The axis of symmetry (center line) between the two blade surfaces of at least one of the cutting blades can be inclined in pipe insertion direction, independent on the angle between both blade surfaces, in particular in such a manner that the angle between this axis of symmetry and the longitudinal axis (pipe insertion direction) is smaller than 80°, in particular smaller than 70°, preferably smaller than 60° so as to ensure an improved retaining function and to keep the pipe from sliding out of the press connection.

Preferably, the cutting blades are also sharp-edged and acute-angled.

According to a further embodiment of the fitting according to the invention, the cutting blades are integrally molded to the hollow body, for example by means of welding, or are embodied in one piece with said hollow body. The cutting blades can thus be produced in a particularly simple manner.

According to yet a further embodiment of the fitting according to the invention, this fitting is free from accommodations for separate cutting rings. Due to the cutting blades, which are provided according to the invention and which are embodied in a particular manner, it is possible to completely do without separate cutting rings. The corresponding accommodations for such separate cutting rings, which would otherwise lead to a disadvantageous weakening of the cross section of the wall thickness of the fitting, which must already be embodied so as to be relatively thin due to the high stability, are thus also no longer necessary. In other words, the wall thickness of the fitting can be reduced to a particularly high extent according to the invention, without additional accommodations for cutting rings being able to negatively impact the stability, in particular the pull out strength or compression strength, respectively.

According to a further embodiment, the cutting edges are embodied in such a manner that they notch or cut, respectively, into the surface of a pipe inserted into the fitting in response to the pressing. Notching or cutting, respectively, means that the cutting edges are sharp-edged to such an extent that they cut into the pipe surface at the contact point. Contrary thereto, however, blunt cutting blades, that is, serrations, only indent the pipe surface. A notching or cutting, respectively, leads to an improved anchoring of the cutting blades in the pipe surface, thus not only improving the axial securing but also the tightness.

The arrangement and embodiment of the cutting blades provided according to the invention has the advantage that each cutting blade can work optimally, without the one cutting blade being capable of negatively impacting the function of the other cutting blade. According to a further embodiment of the fitting according to the invention, exactly two cutting blades are thus sufficient for each pressing section so as to ensure an optimal fixing in axial direction. According to this, exactly one cutting blade is thus arranged between the front end of the fitting (pipe insertion end) and the bead and exactly one further cutting blade is arranged between the bead and the other end of the fitting or pressing section, respectively. Provision can in particular be made on the inside, preferably within the pressing section, for a stop for the pipe end and the cutting blade located further on the inside can be arranged between bead or groove, respectively, and said stop.

Not all of the blade surfaces must necessarily run angled to the longitudinal axis or to the pipe insertion direction, respectively. In the non-pressed state, one of the blade surfaces can also extend parallel to the longitudinal axis. In so doing, the respective cutting blade can already be produced by introducing only a single circumferential recess in the interior of the pressing section, which considerably simplifies the production of the cutting blades. In response to suitably attaching the press tool to the pressing section, which will be defined in more detail below, namely in such a manner that the respective cutting blade is located exactly within the radial projection surface of a press rib of the press tool, it is made possible for the cutting blade to optimally dig into the pipe surface even in the event that the one blade surface, in the non-pressed state, extends parallel to the longitudinal axis. Preferably, the impact of the press tool makes it possible for the cutting blade, in its non-pressed state, to slightly turn relative to its initial position and to thus dig itself deeper into the pipe surface.

To be able to optimally guide the pipe during the insertion and to attain the largest possible contact surface between fitting and pipe surface in the pressed state for the purpose of supporting the axial fixing and tightness, provision is made according to a further embodiment of the fitting, for a pipe bearing section in each case to connect on both sides of the bead, with the inner surface of said pipe bearing section in its non-pressed state extending parallel to the longitudinal axis. By providing a pipe bearing section, which connects directly to the bead on both sides, the distance between the at least two cutting blades is also increased to the extent that they can have a particularly small impact on one another in response to the pressing. Preferably, the walls on the inside of the pipe bearing sections are smooth, that is, they do not comprise any cutting blades, serrations or other unevenness. Both pipe bearing sections thereby have in particular the same inner diameter in this case.

As was already specified above, one of the blade surfaces of a cutting blade can in each case be produced in that provision is made on the inside for a recess in the pressing section. According to an embodiment of the fitting according to the invention, provision is made in each case on either side of the bead on the inside for a recess comprising two side walls and, if applicable, one bottom, wherein one of the side walls forms one of the blade surfaces. The production of the cutting blades thus becomes particularly simple. The cross section of the recess can also be formed to be round or triangular, at least in sections. Preferably, the respective recess connects directly to a pipe bearing section. In particular, the respective other blade surface, which is not formed by the depression, is then formed by a part of the pipe bearing section, which is adjacent thereto.

Due to the fact that, as already mentioned, the wall thickness should be reduced as much as possible because of the relatively high stability of the lead- and nickel-free red brass alloy, it is advantageous when the recesses, by means of which one of the blade surfaces is produced in each case, do not lead to a noteworthy weakening of the cross section as much as possible, thus are as flat as possible. According to an embodiment of the fitting according to the invention, the depth of at least one of the recesses is thus smaller than the depth of the groove for accommodating the sealing ring formed in the bead. In this case, the depth of at least one of the recesses can be at least twice, in particular at least five times, preferably at least ten times smaller than the depth of the groove which is formed in the bead.

So that the relatively deep groove in the bead also does not lead to a noteworthy weakening of the cross section, it is advantageous when the wall thickness of the fitting is constant in the area of the bead. In particular, the wall thickness in the area of the bead is at least as large as in the area of the depression, which forms the respective blade surface, or in the area of the adjacent pipe bearing section or sections, respectively. Preferably, the interior of the bead, that is, of the groove, has a smooth wall, thus does not comprise any cutting blades, serrations or other unevenness.

It is emphasized that the afore-described features relating to the arrangement and the embodiment of at least one of the cutting blades can preferably also apply to all of the cutting blades.

According to a second teaching of the present invention, the object is further solved by means of a pressing system for connecting a pipe, in particular for the installation field, comprising a fitting, as it was described above and comprising a press tool, which can be attached prior to the pressing and which can be detached after the pressing. In other words, the pressing system comprises a press tool which comes into contact with the fitting in particular with the pressing area only temporarily for the purpose of pressing, but which is subsequently removed again, without thus influencing the established connection and tightness.

The press tool can comprise at least two press jaws, which can be moved towards one another during pressing at right angles to the longitudinal axis, referring to the longitudinal axis of the fitting. At least two of the press jaws can in each case comprise at least two press ribs, which project out of the remaining press jaw in radial direction. According to an embodiment of the pressing system according to the invention, these press ribs come to rest on the outside of the fitting in the pressing section during pressing in such a manner that the cutting blades, in particular the cutting edges, are arranged within the radial projection surface of the press ribs. On the one hand, the maximal pressure is thus built up exactly in the area of the cutting edges. On the other hand, it can thus be attained that, in response to the pressing, the cutting blade twists slightly relative to its initial position about a cross axis to the longitudinal axis of the fitting and thus digs itself deeper into the pipe surface. According to a further embodiment of the pressing system, it is particularly preferred when only one cutting blade, in particular only one cutting edge, is arranged within the radial projection surface of one of the press ribs.

Figure 1B:
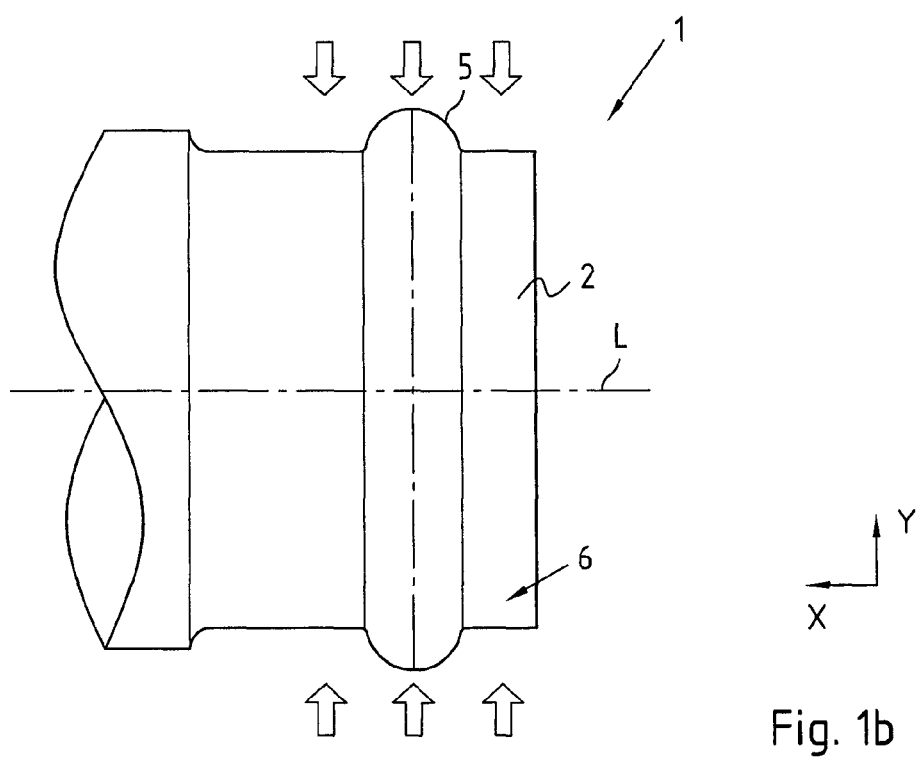
Figure 2A:
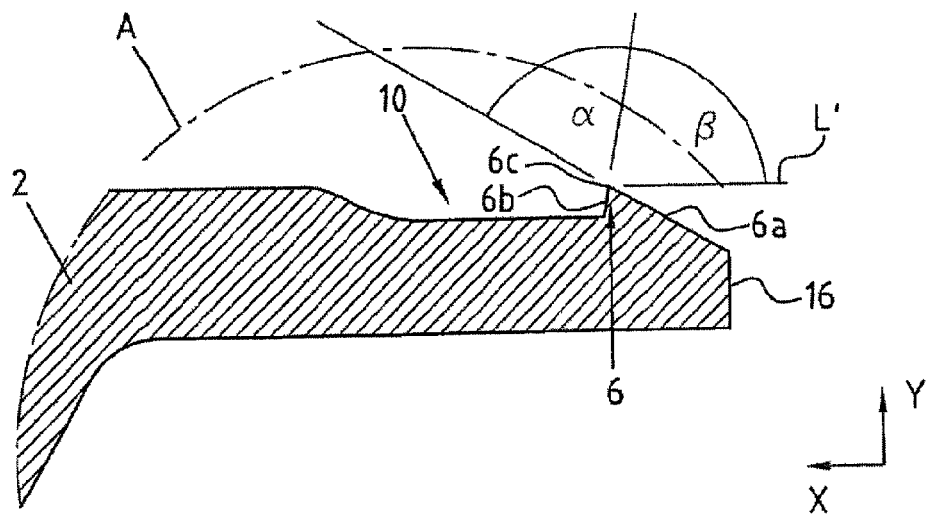
Figure 2B:
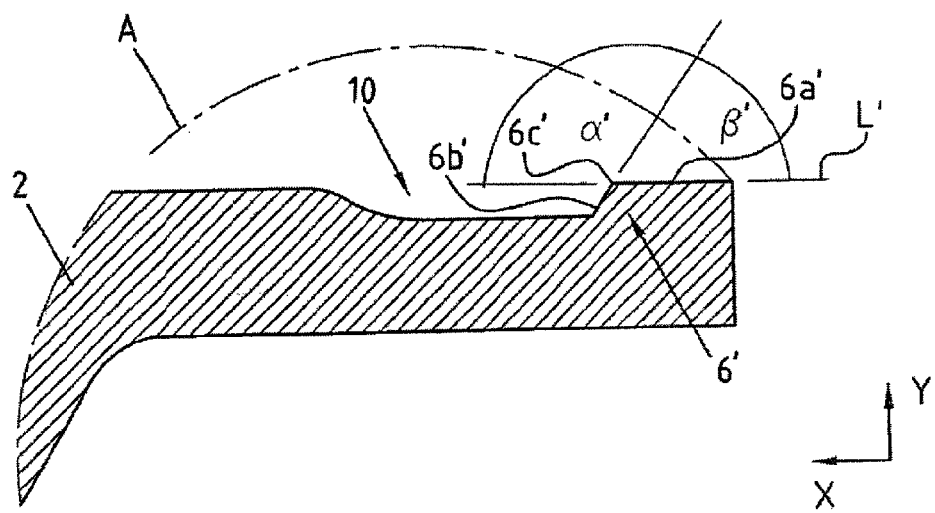
Figure 3:
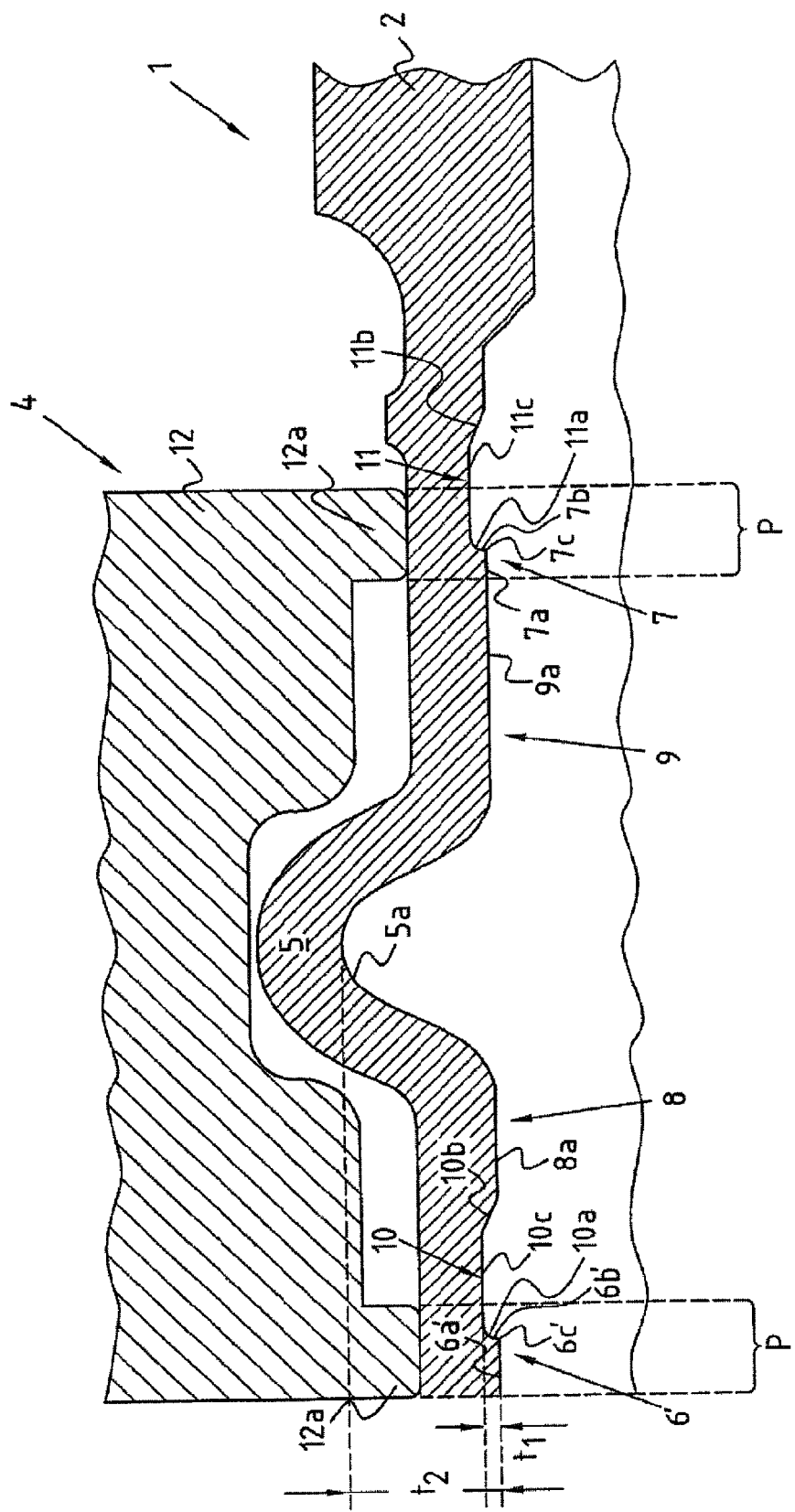

There is now a plurality of possibilities for embodying and further developing the fitting according to the invention and the pressing system according to the invention. For this, reference is made on the one hand to the patent claims, which are dependent on patent claim 1, on the other hand to the description of an exemplary embodiment in connection with the drawing. In the drawing:

FIG. 1*a*) shows a sectional view of a fitting according to the present invention, FIG. 1*b*) shows a top view onto the fitting according to FIG. 1*a*), FIG. 2*a*) shows an enlarged detail of a cutting blade from the exemplary embodiment according to FIG. 1*a*), FIG. 2*b*) shows a corresponding enlarged detail of another exemplary embodiment of a fitting and FIG. 3 shows a sectional view of an exemplary embodiment of a pressing system according to the invention.

FIGS. 1*a*) and *b*) show a fitting 1 consisting of a lead and nickel-free red brass alloy for connecting a pipe (not illustrated), in particular for the installation field, wherein the fitting 1 comprises a hollow body 2 which extends in a pipe insertion direction X about a longitudinal axis L. The hollow body 2 comprises a pressing section 3, wherein arrows in FIG. 1*b*) illustrate the pressing motion of the press jaws 12 of a press tool 4, which is to be attached accordingly. In response to the pressing, the fitting 1 is plastically deformed in radial direction Y in the area of the pressing section 3 by means of cold forming, so that a press fit is created between pipe and fitting.

Prior to being plastically deformed inwardly in the radial direction by pressing, the pressing section 3 comprises a first portion 3*a*, a second portion 3*b* and a third portion 3*c*. The first portion 3*a* of the pressing section 3 extends from an end face 16 (see FIG. 2*a*) of the fitting to a circumferential bead 5 which projects outwardly in radial direction and which, on the inside, forms a groove 5*a* for accommodating a sealing 5 ring (not illustrated). The second portion 3*b* of the pressing section 3 is defined by the circumferential bead 5. The third portion 3*c* of the pressing section 3 extends from the circumferential bead 5 to a section of the hollow body 2 which has a larger outer diameter than an outer diameter of the third portion 3*c*. An outer diameter of the first portion 3*a* is the same as the outer diameter of the third portion 3*c*. And, the outer diameters of the first portion 3*a* and the third portion 3*c* are constant over their entire lengths, respectively.

The pressing section 3 further comprises two cutting blades 6 and 7, which are embodied integrally with the hollow body 2 on the inside and each of which has a cutting edge 6*c* or 7*c*, respectively, which is formed by a first blade surface 6*a* or 7*a*, respectively, and a second blade surface 6*b* or 7*b*, respectively. In the present case, the hollow body, only a section of which is illustrated herein, is produced by means of sand casting. On principle, however, the production by means of continuous casting or by means of forming, in particular by means of pressure forming, of a corresponding pipe section is also possible. After the production of the hollow body, the two cutting blades have been produced by means of a machining process.

In the case of the illustrated fitting 1 or press connection, respectively, provision is made for only two cutting blades. The two cutting blades are spaced apart from one another to the extent that the one cutting blade cannot impact the effect of the respectively other cutting blade in response to the pressing. The one cutting blade 6 is arranged upstream of the bead 5 relative to the pipe insertion direction X and the other cutting blade 7 is arranged downstream from the bead, also relative to the pipe insertion direction X.

The special arrangement and embodiment of the two cutting blades 6 (FIGS. 1 and 2a)), 6' (FIGS. 2b) and 3) and 7 will be described below by means of detail A, which is illustrated in FIGS. 2a) and b) for different examples. The same exemplary embodiment as in FIG. 1a) is illustrated in FIG. 2a). An alternative exemplary embodiment is illustrated in FIG. 2b). In each case, both exemplary embodiments show only the front, that is, the first cutting blade 6, 6' in insertion direction X. The form of the second cutting blade 7 (not illustrated in FIGS. 2a) and b)) corresponds to the exemplary embodiment of the first cutting blade 6' in FIG. 2b). The cutting blade 7 is also illustrated in FIG. 3.

In the non-pressed state in FIG. 2a), the angle α between the two blade surfaces 6a and 6b is 70°. Also in the non-pressed state, the angle β between the blade surface 6b pointing in pipe insertion direction X and the longitudinal axis L of the hollow body 2 is 80°. To illustrate the angle β, only one parallel line L' to the longitudinal axis L is illustrated herein for clarity reasons. Here the blade surface 6b was created by means of a recess 10, which was inserted subsequently by means of machining. The recess 10 comprises a bottom 10c and two side walls 10a and 10b, wherein the side wall 10a forms said blade surface 6b. The cutting edge 6c resulting from the two blade surfaces 6a and 6b is sharp-edged and is embodied in such a manner that it digs itself into the surface of a pipe (not illustrated), which is inserted into the fitting 1 in response to the pressing. The blade surface 6a (which in FIG. 2a is a blade surface of the circumferential cutting blade arranged upstream of the circumferential bead relative to the pipe insertion direction) defines a conical surface that extends from the end face 16 of the fitting to the cutting edge 6c.

The exemplary embodiment in FIG. 2b) differs from the exemplary embodiment illustrated in FIG. 2a) in that, in the non-pressed state, the angle α' between the two blade surfaces 6a' and 6b' is 120°, whereas the angled β' between the blade surface 6b' and the longitudinal axis L or the parallel line L', respectively, is also 60°. Incidentally, the blade surface 6b' was here also created by recessing a recess 10, as it was described above. The resulting cutting edge 6c' is here also sharp-edged and digs itself into the surface of a pipe, which is inserted into the fitting 1, in response to the pressing.

FIG. 3 shows a pressing system comprising a fitting 1, which corresponds to the exemplary embodiment of FIG. 2b), as well as comprising a press tool 4, which can be attached prior to the pressing and which is detached again after the pressing.

The press tool 4 comprises two press jaws 12, only the upper press jaw of which is illustrated here. The press jaws 12 are moved toward one another during pressing at right angles to the pipe insertion direction X or at right angles to the longitudinal axis L, respectively.

The press jaws 12 comprise two press ribs 12a, which are spaced apart from one another and which come to rest on the outside of the fitting 1 in the pressing section 3 in response to the pressing in such a manner that the cutting blades 6' and 7, in particular the cutting edges 6c' and 7c, are arranged within the radial projection surface P of the press ribs 12a.

In the case of the pressing systems according to the present invention, provision is made between the two press ribs 12a in both press jaws 12 for a recess, which is embodied in a substantially T-shaped manner, thus comprises a section, which is cut deeper, and a section, which is cut less deep. In response to the attaching of the press tool 4 to the fitting 1, the deeper section accommodates the circumferential bead 5, thus automatically aligning the press jaws 12 during the pressing relative to the fitting 1 or pressing section 3, respectively, in such a manner that the cutting blades 6 and 7 are in each case arranged within the radial projection surfaces P of the press ribs 12.

As can further be derived from FIG. 3, the cutting edges 6c and 7c initially notch or cut, respectively, into the inserted pipe end (not illustrated) in response to the pressing, wherein the bead 5 is subsequently formed by the deeper section of the recess, here into a hexagon.

As can finally also clearly be seen in FIG. 3, the depth $t_1$ of the two recesses 10 and 11—the depth $t_2$ of both recesses 10 and 11 is identical herein—is smaller than the depth $t_2$ of the groove 5a formed in the bead. More accurately, the depth $t_1$ is smaller than the depth $t_2$ by the factor nine. In the area of the bead 5 and in the area of the pipe bearing sections 8 and 9, which connect to the inside of the bead 5 on both sides and the inner surfaces 8a and 9a of which extend parallel to the longitudinal axis in their non-pressed state, the wall thickness is constant, as is shown in FIG. 3. The recesses 10 and 11 thus represent the only cross section reductions. With the use of such a design, a high stability, in particular a high pull out strength or compression strength, respectively, is thus attained even for the lead and nickel-free red brass alloy, which is used herein for the fitting 1.

The invention claimed is:
1. A fitting for connecting a pipe,
wherein the fitting consists of a lead-free and nickel-free red brass alloy and comprises a hollow body made in one piece extending in a pipe insertion direction about a longitudinal axis,
wherein the hollow body comprises at least one pressing section, which can be plastically deformed inwardly in a radial direction by means of a press tool, which can be attached to the fitting prior to pressing and which can be detached from the fitting after pressing,
wherein, prior to being plastically deformed inwardly in the radial direction by pressing, the pressing section comprises a first portion, a second portion and a third portion, wherein the first portion of the pressing section extends from an end face of the fitting to a circumferential bead that projects outwardly in the radial direction and which, on an inside of the hollow body, forms a groove for accommodating a sealing ring, wherein the second portion of the pressing section is defined by the circumferential bead, wherein the third portion of the pressing section extends from the circumferential bead to a section of the hollow body which has a larger outer diameter than an outer diameter of the third portion, wherein an outer diameter of the first portion is the same as the outer diameter of the third portion, and wherein the outer diameters of the first portion and the third portion are constant over their entire lengths, respectively, wherein the fitting further comprises pipe bearing sections on the inside on both sides of the groove, wherein each of said pipe bearing sections has an inner surface that extends parallel to the longitudinal axis prior to pressing, wherein the hollow body further comprises at least two recesses provided on the inside within the pressing section, wherein one of the at least two recesses is arranged upstream of the circumferential bead relative to the pipe insertion direction, wherein one of the pipe bearing sections is arranged between the circumferential bead and said one of the at least two recesses, wherein an other of the at least two recesses is arranged downstream of the circumferential bead relative to the pipe insertion direction, wherein an other of the pipe bearing sections is arranged between the circumferential bead and said other of the at least two recesses, wherein the pressing section further comprises at least two circumferential cutting blades, which are integral with the hollow body on the inside, each of which comprises a cutting edge that is formed by a first blade surface and a corresponding second blade surface, said cutting blades both being configured to engage with an outer surface of the same pipe, wherein one of the at least two circumferential cutting blades is arranged upstream of the circumferential bead relative to the pipe insertion direction, wherein an other of the at least two circumferential cutting blades is arranged downstream of the circumferential bead relative to the pipe insertion direction, wherein each of said at least two recesses comprises a side wall that defines the corresponding second blade surface of one of the at least two circumferential cutting blades, wherein, when the fitting is viewed in a halving cross section parallel to the longitudinal axis in a non-pressed state, an angle $\alpha$ between a first ray and a second ray having a common endpoint at the cutting edge of at least one of said circumferential cutting blades is 70° or greater, wherein the first ray extends from the endpoint toward the inside of the hollow body along a line extending in a plane of the cross section defined by the first blade surface, and wherein the second ray extends from the endpoint away from the second blade surface toward the longitudinal axis of the hollow body along a line extending in the plane of the cross section defined by the corresponding second blade surface, wherein, when the fitting is viewed in the halving cross section parallel to the longitudinal axis in the non-pressed state, an angle $\beta$ between the second ray and a third ray extending from the common endpoint along a line extending parallel to the longitudinal axis in the plane of the cross section in a direction opposite the pipe insertion direction is 60° or greater, wherein the first and third portions of the pressing section contain only one cutting blade each, and wherein the first blade surface of the circumferential cutting blade arranged upstream of the circumferential bead relative to the pipe insertion direction defines a conical surface that extends from the end face of the fitting to the cutting edge of the circumferential cutting blade arranged upstream of the circumferential bead relative to the pipe insertion direction.

2. The fitting according to claim 1, wherein, in the non-pressed state, the angle $\alpha$ is at least 90°.

3. The fitting according to claim 1, wherein the fitting does not include any separate, non-integrally formed cutting rings.

4. The fitting according to claim 1, wherein the cutting edges are embodied in such a manner, that during pressing they cut into the surface of a pipe which is inserted into the fitting.

5. The fitting according to claim 1, wherein a depth of at least one of the recesses is less than a depth of the groove.

6. The fitting according to claim 5, wherein the depth of at least one of the recesses is at least two times less than the depth of the groove.

7. A pressing system for connecting a pipe, the system comprising:
    a fitting according to claim 1; and
    a press tool, which can be attached to the fitting prior to the pressing and which can be detached from the fitting after the pressing.

8. The pressing system according to claim 7, wherein the press tool comprises at least two press jaws, which can be moved towards one another in response to pressing perpendicular to the longitudinal axis, wherein the at least two press jaws each comprise at least two press ribs, which come to rest on the outside of the fitting in the pressing section during pressing in such a manner that the cutting blades are arranged within a radial projection of the press ribs.

9. The pressing system according to claim 8, wherein only one cutting blade is arranged within the radial projection of each of the at least two press ribs.

* * * * *